(12) United States Patent
Sneed

(10) Patent No.: US 10,748,367 B2
(45) Date of Patent: Aug. 18, 2020

(54) BEST2000D™: ENCRYPTION CURRENCY COUNTER MEASURE AND DETERRENCE AGAINST COUNTERFEITING U.S. BILLS

(71) Applicant: Anthony Sneed, Claremont, CA (US)

(72) Inventor: Anthony Sneed, Claremont, CA (US)

( * ) Notice: Subject to any disclaimer, the term of this patent is extended or adjusted under 35 U.S.C. 154(b) by 5 days.

(21) Appl. No.: 15/892,642

(22) Filed: Feb. 9, 2018

(65) Prior Publication Data

US 2019/0251772 A1 Aug. 15, 2019

(51) Int. Cl.
*G07D 7/12* (2016.01)
*G06T 7/00* (2017.01)
*G06K 9/62* (2006.01)
*G06K 9/00* (2006.01)

(52) U.S. Cl.
CPC ........... *G07D 7/12* (2013.01); *G06K 9/00577* (2013.01); *G06K 9/6201* (2013.01); *G06T 7/0002* (2013.01); *G06K 2009/0059* (2013.01)

(58) Field of Classification Search
CPC .............. G06K 9/00577; G06K 9/6201; G06K 2009/0059; G06T 7/0002
See application file for complete search history.

(56) References Cited

U.S. PATENT DOCUMENTS

| | | | | |
|---|---|---|---|---|
| 8,714,336 B2* | 5/2014 | Csulits | ..................... | G07D 7/12 194/207 |
| 8,929,640 B1* | 1/2015 | Mennie | .............. | G06K 9/00469 382/135 |
| 2003/0059098 A1* | 3/2003 | Jones | .................... | G06Q 20/042 382/135 |
| 2004/0028266 A1* | 2/2004 | Jones | ................... | G06Q 20/042 382/135 |
| 2007/0180262 A1* | 8/2007 | Benson | ............ | G07B 17/00508 713/186 |
| 2010/0032477 A1* | 2/2010 | Faulkner | ................ | G06Q 40/02 235/379 |
| 2012/0189186 A1* | 7/2012 | Csulits | ..................... | G07D 7/12 382/135 |
| 2013/0166422 A1* | 6/2013 | Soni | ....................... | G06Q 40/10 705/30 |
| 2015/0146963 A1* | 5/2015 | Klein | ................. | G06K 9/00469 382/135 |
| 2016/0027042 A1* | 1/2016 | Heeter | ............... | G06Q 30/0248 705/14.47 |
| 2019/0197832 A1* | 6/2019 | Lawson | ............. | G07F 17/3258 |

* cited by examiner

*Primary Examiner* — Santiago Garcia
(74) *Attorney, Agent, or Firm* — One LLP

(57) ABSTRACT

System and method for encryption currency counter measure and deterrence against counterfeiting. The system tracks the FSN for each FRN, from the time a serial number is assigned to a new bill, until the time the bill is retired from circulation.

2 Claims, 1 Drawing Sheet

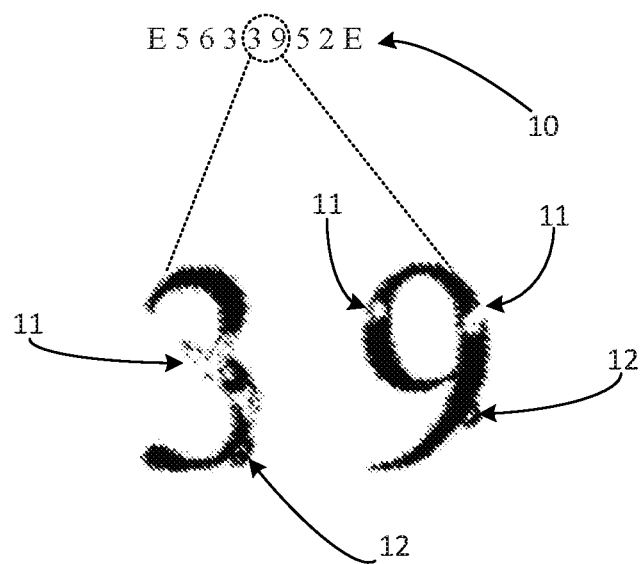
FIG. 1
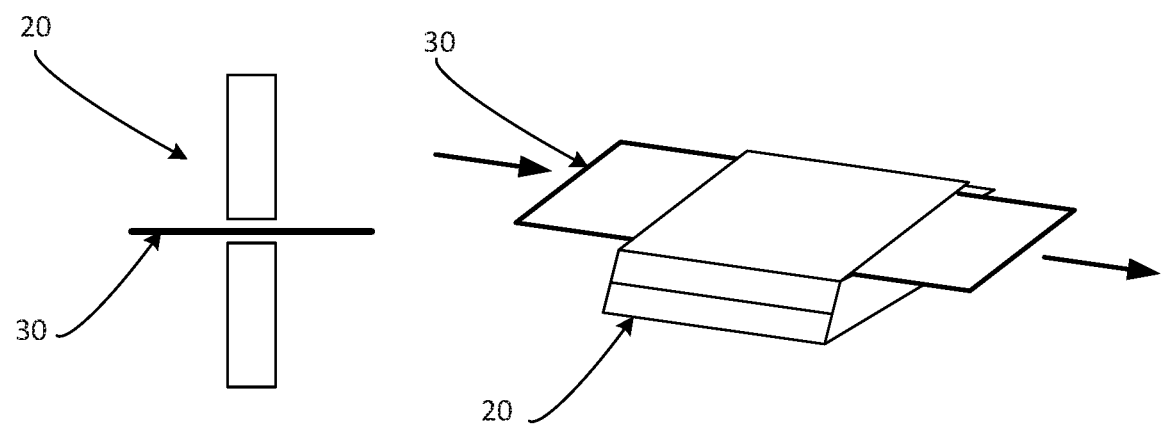
FIG. 2A
FIG. 2B

BEST2000D™: ENCRYPTION CURRENCY COUNTER MEASURE AND DETERRENCE AGAINST COUNTERFEITING U.S. BILLS

RELATED APPLICATION DATA

The present application claims the benefit under 35 U.S.C. 119(e) of the priority date of Provisional Application Ser. No. 62/498,906 filed Jan. 9, 2017, which is hereby incorporated by reference.

BACKGROUND OF INVENTION

Currencies of the U.S. and other national entities are constantly under threat of counterfeiting. Security measures and technological enhancements to such currencies can deter counterfeiting for limited periods. However, these countermeasure efforts must be periodically updated, and do not include legacy bills that may continue to circulate, for years and decades, without enhanced countermeasure security features. The present invention deters counterfeiting of both legacy bills and bills issued in the future with enhanced security measures not contained on legacy bills.

BRIEF SUMMARY OF INVENTION

The system herein works transparently, and in parallel with other technology and security measures, to meet the ongoing counterfeiting challenge, for both legacy bills without new security enhancements, and new ones which employ such enhancements. The system tracks the FSN for each FRN, from the time a serial number is assigned to a new bill, until the time the bill is retired from circulation. The system also tracks serial numbers prior to assignment, which may be held in reserve for future use. The system uses the Internet Of Things Architecture (IOTA™) devices (IOTA™ devices) that read FSNs contained on FRNs. IOTA™ herein refers the Internet's ability to have many "things" connected to it, commonly referred to as the "Internet of Things" in the art. IOTA™ devices connect to CMA servers via the Internet, directly, and through PCs, and through servers as circumstances require. CMA servers retain a repository of FSNs, both in use, held in reserve, and retired from use. CMA servers apply Big Data analytics to detect counterfeit FRNs.

BRIEF DESCRIPTION OF FIGURES

FIG. 1 shows an image of is an example of a serial number with two digits of the serial number enlarged.

FIG. 2A is aside view of a single-note-reader.

FIG. 2B is a perspective view of the single-note-reader.

DETAILED DESCRIPTION OF INVENTION

The system works by detecting violations of causality, whereby an FRN is captured at two different locations, "simultaneously," which is impossible since each FRN the government issues is unique and can not be used simultaneously at two different locations. A Simultaneous Note Detection Event (SNDE) occurs when CMA servers detect two or more IOTA™ devices, at different Transaction Locations, capturing the same FSN, at or about the same time. This is indicative of a counterfeit FRN in circulation, including detecting the first-use of a counterfeit FRN. Also, an FRN the invention detects at location-A, and later detects at location-B, sooner than the time for a physical item to reasonably transit the distance between the two locations is called a Transitory Simultaneous Note Detection Event (TSNDE). Big Data analytics on CMA servers detect both SNDEs and TSNDEs using time-triggering thresholds that determine detection sensitivity.

The system considers each FRN to be as unique as a snowflake, relative to "freckles" the FRN contains, freckles being the side effects from high-speed printing and the formation of characters, numbers, or images on the face of a FRN. Such freckles allow each bill to have a uniquely digitized signature, much as a finger-print is unique to a person. The CMA servers retain an FRN's Federal-Reserve-Note Digitized Profile (FDP) with the FRN's serial number. An FRN detected with the wrong FDP also represents a possible counterfeiting event.

The production and issuing of new FRNs occurs using extant methods, by the U.S. Treasury and similar currency issuing institutions, with the inclusion of an array of image scanners between, 1) the manual inspection step of sheets containing the requisite number of completed bills per sheet, which is typically 32, and 2) cutting up the sheets into individual bills. Between steps 1 and 2, the sheets are passed through an array of image scanners, that aligns under the imaging array with, specific scanning resolution for the content areas of each bill on the sheet, to capture denomination, serial number, and other content areas for producing a unique FDP for each bill. The scanning array, for each bill, captures components necessary to uniquely identify the bill with its FSN, using "freckles" near or on printed matter on the face of the bill. Imaging process captures the serial number and designated printed matter of interest and freckles thereof. FIG. 1 shows an example of a serial number 10, and a close up of freckles 11 and speckling 12 on enlarged digits "39". Such printed matter includes freckles, in the form of speckled and splattered ink, produced on the edges, interior and exterior outlines of a bill's denomination, serial number, and other content areas, deposited by high-speed printers, the freckles in the form of speckled and splattered ink unique to a bill, including those for a one-hundred dollar bill. The imagining captures the freckles in the form of speckled and splattered ink, which differ bill to bill, based on ink-residue speckling and splattering from printing press operation, and actual printing of a unique serial number, on each bill, by high-speed printers. The system produces and retains unique FDP from specifically selected content areas of a bill, using freckles to create a unique FDP, as a digitized binary value, like all other data recorded, such as denomination and serial number, stored in CMA servers for each FRN. The FDP is generated, bill to bill, from the same, specifically selected content areas. This does not exclude using different content areas for different denominations and specific serial number ranges, which, like an Enigma encoding machines, multiples the permutations counterfeiters must consider before undertaking that leads to easy detection. Such selection does not exclude using variations on the face of serial numbers and other content areas, their light and dark speckling across digits' faces, and on specific digits' faces, and other unique freckling in the form of speckling and splattering for digits and other content areas the invention uses to generate each unique FDP. The forgoing does not exclude using a 0.5 cm×0.5 cm square area on Benjamin Franklin's shoulder (his right one rather than the his darkened left one for recent hundred dollar bills) to generate a consistent FDP for a bill, using freckling in the form of speckled and splattered ink from this in conjunction with other content areas as sophistication warrants.

Additionally, if not already practiced, federal serial numbers are denominationally specific, within preset FSN-ranges: $f_1 \ldots f_j$ as one dollar bills; $f_{j+1} \ldots f_k$ as fives; $f_{k+1} \ldots f_m$ as tens; $f_{m+1} \ldots f_n$ as twenties; $f_{n+1} \ldots f_p$ as fifties; $f_{p+1} \ldots f_q$ as hundreds; and $f_{q+1} \ldots f_r$ as five-hundred dollar notes. Five-hundred notes may be reintroduced to circulation after IOTA™ devices are in widespread use. The ranges are not publicly disclosed, and allow acrostically dispersed notes of a different denomination, called Note-Range Exceptions (NRE's). Counterfeiters would be unaware of the NRE's, which are detected when an FSN of an FRN triggers a "range error" indicative of counterfeiting.

The system is enabled by Encrypted Note Counting Machines (ENCMs). Unlike regular Note Counting Machines (NCMs), which simply count stacks of bills loaded into them, an ENCM also captures the denomination and FSN as each bill is counted. The FSN and denomination, after capture, are stored in a Note Detection File (NDF) on a computer, which is not excluded from being a server, by batches or for an individual bill. ENCMs have the imaging and resolution capability to also capture FDP content areas of an FRN. The NDF header information contains date and time of capture, as well as its origin. Thus, a particular business entity produces multiple NDFs over the course of a day, each containing the business entity's numeric ID information. The numeric ID is cross referenced on CMA servers to provide business name, location, including geodetic information, address, phone, etc. By cloud transfer over the Internet, herein called IOTA™, CMA servers, as part of the U.S. Treasury and its currency oversight and issuing agencies thereof that monitor U.S. currency movement and use (a different agency for foreign governments) receive NDFs.

CMA servers perform Big Data analytics on NDFs, to detect SNDEs; TSNDEs; "range-errors," for FSNs not in the appropriate range; FDPs, that don't match FSNs on their respective FRNs; Transaction Locations, scanning bills provides a rich data stream of information to CMA servers, and instantaneous snapshots of FSN movement in the economy. For example, Big Data analytics on CMA server will flag a single SNDE without investigative follow-up. However, a pattern of SNDEs, or clustering of SNDEs, across multiple Transactions Locations, triggers investigative follow-up, of varying degrees, based on severity of preset parametric thresholds, very much as an adaptive filter adjusts to noise with varying signal dynamics. Single-note readers are of low-cost and very compact, within IOTA™ connectivity standards for Internet communications protocols with CMA servers. Any cell-phone with a "CMA server app," popularized as a "counterfeit detection app," is a single-note reader and an IOTA™ device. The app has the capability to provide notification of counterfeit detection, based on CMA server analytics, after scanning a bill with the app. This does not exclude any IOTA™ device having the same capability. Such app and IOTA™ devices support total information awareness from the use of a physical currency, within a nation, to the benefit of the security of the currency and its transparent use by the public. TSNDE and SNDE detection is within state-of-art technology and Big Data analytics, when one considers response times for, say, millions of Google® searches every minute. A physical currency, with a trillion bills in circulation, scales easily within state-of-the-art technology, allowing virtually certain detection of TSNDE and SNDE triggers, and other image-content inconsistencies, in real-time, especially for single-note readers and IOTA devices.

FIG. 2 shows a single-note-reader 20. It captures the image if a Federal Reserve Note 30. It is small and compact enough to be attached to a point-of-sale device. It provides audible and display indicators about a Federal Reserve Note's status. A cell-phone is not excluded from being a single-note-reader, with an app that images a Federal Reserve Note, and provides audible and display indicators of a Federal Reserve Note's status.

Again, as incentive to scan single bills, initially, liability may be waived for any bill read by a single-note reader, even if the invention detects counterfeiting. This does not exclude bills uploaded in an NDF, as well. This would give businesses "nothing to lose" by scanning everything, which enhances the ability to detect counterfeiting at its source, even before a counterfeit item "ages" through repeated use. This helps preserve the convenience, transparency, and use of a physical currency, into perpetuity, through voluntary participation by the public that limits liability. The invention also provides powerful metrics through Big Data analytics, for a range of governmental agencies that monitor the performance of an economy, to a degree not possible without this invention.

What is claimed is:

1. A system for detecting counterfeit currency notes, the system comprising:

an imaging array configured to scan a plurality of currency notes and capture one or more images from a face of each individual one of the plurality of currency notes;

an image processor configured to digitize the one or more images of each individual one of the plurality of currency notes to identify a serial number captured in the one or more images of each individual one of the plurality of currency notes, wherein the captured serial number is unique to the individual one of the plurality of currency notes from which the one or more images are captured, and generate a digital profile of one or more content specific areas of each individual one of the plurality of currency notes, wherein the one or more content specific areas include a distribution of ink based freckles from ink speckling and splattering on the face of each individual one of the plurality of currency notes during printing of the plurality of currency notes, wherein the distribution of the freckles within the one or more content specific areas and the digital profile of the one or more content specific areas are unique to the individual one of the plurality of currency notes from which the one or more images are captured;

one or more computer servers having one or more databases and configured to store the unique serial number and the unique digital profile of each individual one of the plurality of currency notes, wherein the unique digital profile of each individual one of the plurality of currency notes when stored is indexed and cross-referenced within the one or more databases to the unique serial number of the individual one of the plurality of currency notes from which the one or more images are captured; and a point-of-sale device remotely located from the one or more computer servers at a transaction location and configured to scan and capture image content information from the face of an individual point-of-sale note including a serial number and one or more content specific areas of the point-of-sale note, wherein the point-of-sale device is configured to transmit the image content information over a communication network to the one or more servers to detect differences between the image content information of the point-of-sale note and the unique digital profile of an individual one of the plurality of currency notes having a unique serial matching the serial number of the point-of-sale note.

2. The system of claim 1, wherein the point-of-sale device has a unique identification number and is further configured to transmit the identification number and transaction location identification information with the image content information of the point-of-sale note to the one or more servers.

\* \* \* \* \*